United States Patent
Friedman et al.

(10) Patent No.: US 8,817,050 B1
(45) Date of Patent: Aug. 26, 2014

(54) N-PATCH IMAGE RESIZING

(75) Inventors: Mark S. Friedman, Mountain View, CA (US); Michael A. Cleron, Menlo Park, CA (US); Dianne K. Hackborn, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1317 days.

(21) Appl. No.: 11/925,259

(22) Filed: Oct. 26, 2007

(51) Int. Cl.
*G09G 5/00* (2006.01)

(52) U.S. Cl.
USPC ............ 345/660; 345/647; 345/661; 345/671

(58) Field of Classification Search
USPC .......... 453/660, 661, 671; 345/660, 661, 671, 345/647, 698, 666; 715/846, 792
See application file for complete search history.

(56) References Cited

U.S. PATENT DOCUMENTS

| | | | | |
|---|---|---|---|---|
| 5,553,225 | A * | 9/1996 | Perry | 345/660 |
| 5,712,995 | A * | 1/1998 | Cohn | 715/792 |
| 6,392,661 | B1 * | 5/2002 | Tankersley | 345/660 |
| 7,286,145 | B2 * | 10/2007 | Sunata | 345/671 |
| 8,139,089 | B2 * | 3/2012 | Doyle et al. | 345/647 |
| 2007/0076020 | A1 * | 4/2007 | Fleming et al. | 345/698 |
| 2008/0158261 | A1 * | 7/2008 | Gould | 345/666 |
| 2009/0217206 | A1 * | 8/2009 | Liu et al. | 715/846 |
| 2010/0315437 | A1 * | 12/2010 | Sinclar et al. | 345/660 |
| 2011/0254866 | A1 * | 10/2011 | Yoshioka et al. | 345/661 |
| 2011/0261081 | A1 * | 10/2011 | Weinblatt | 345/671 |

* cited by examiner

*Primary Examiner* — Chante Harrison
(74) *Attorney, Agent, or Firm* — Fish & Richardson P.C.

(57) ABSTRACT

The subject matter of this specification can be embodied in, among other things, a method that includes receiving an image having indication pixels that define a plurality of regions within the image that are used for resizing the image and determining, based on the indication pixels, two or more of the regions that are stretchable regions that change size when the image is resized. The method also includes resizing the image by changing a size of at least one of the determined stretchable regions.

36 Claims, 11 Drawing Sheets

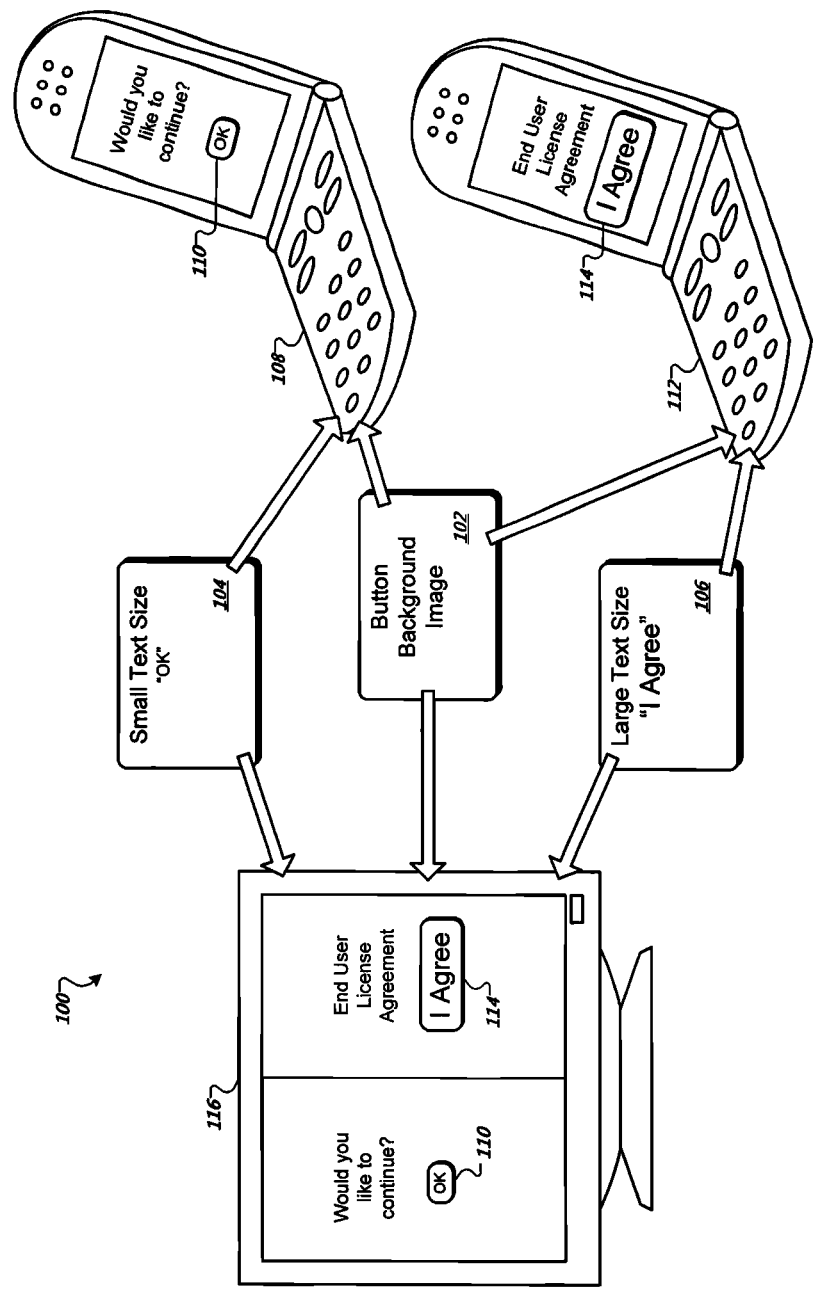

N-PATCH IMAGE RESIZING

TECHNICAL FIELD

This instant specification relates to resizing images.

BACKGROUND

User interfaces may have elements that vary in size. For example, a user interface element can be a button that a user selects to perform an action. The elements may each include a background image that has content, such as text, drawn on the background image. For example, the button may have a blue background image and text that indicates the user should select the button to save a file.

An element of a first size can use a background image of a corresponding first size, and an element of a second size can use different background image that corresponds to the second size. A user interface may use both of these images if displaying two different sized elements even if the images are substantially the same. For example, both images may include a solid green color, but the user interface uses two images of different sizes because the elements displayed are different sizes.

SUMMARY

In general, this document describes methods and systems for defining portions of an image that change in size and portions that are fixed in size when the image is increased and/or decreased in size.

In a first general aspect, a computer-implemented method is described. The method includes receiving an image having indication pixels that define a plurality of regions within the image that are used for resizing the image and determining, based on the indication pixels, two or more of the regions that are stretchable regions that change size when the image is resized. The method also includes resizing the image by changing a size of at least one of the determined stretchable regions.

In a second general aspect, a computer-implemented method is described that includes accessing an image having a border and indicating, using pixels of the image that are part of the border, a plurality of stretchable segments that change size if the image is resized. The method also includes outputting the image having the indicated stretchable segments for use by a graphical interface configured to resize the image.

In another general aspect, a system is described. The system includes an image pre-processor for receiving an image having pixels located in a border of the image that define two or more stretchable regions within the image that are used for resizing the image. The system also includes means for determining, based on the pixels, the stretchable regions that change size when the image is resized and a document display module for resizing the image by changing a size of at least one of the determined stretchable regions.

The details of one or more embodiments are set forth in the accompanying drawings and the description below. Other features and advantages will be apparent from the description and drawings, and from the claims.

DESCRIPTION OF DRAWINGS

FIG. 1 is a schematic diagram showing an example of a system for resizing an image.

Like reference symbols in the various drawings indicate like elements.

DETAILED DESCRIPTION

Figure 2A:
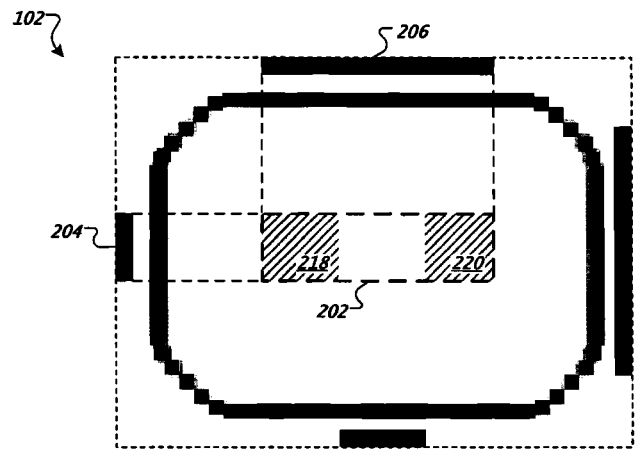
FIG. 2A shows an example of an image that includes a resizable region.

This document describes systems and techniques for resizing an image having multiple resizable, or stretchable, regions along with static, or fixed, regions that do not change size when the image is resized. The image to be resized includes information that defines the resizable regions and the regions that are fixed in size.

FIG. 1 is a schematic diagram showing an example of a system 100 for resizing an image 102. The image 102 may be, for example, a background image of a button icon presented within a user interface. The image 102 may change in size based on drawing information, such as a small text 104 or a large text 106, presented in association with the image 102. The small text 104 may include a message that is shorter than the large text 106 (e.g., "OK" versus "I Agree") and/or the small text 104 may use a font size that is smaller than the large text 106 (e.g., 9 point versus 14 point). In some implementations, the drawing information may include media other than text, such as an image, video, or a combination of media types.

The image 102 includes resizing information that defines one or more resizable regions within the image 102. A user may add resizing information to an image using an image editor, such as Adobe® Photoshop® developed by Adobe Systems Inc. of San Jose, Calif. The image editor may be, for example, pixel based, vector based, or a combination of pixel and vector based.

Drawing information, such as the small text 104 and the large text 106, may be presented in association with one or more of the resizable regions. For example, the image 102 may be presented in association with the small text 104 using a first display device 108. The image 102 is resized according to the included resizing information to accommodate the small text 104 and forms a first resized image 110, as shown in the first display device 108.

In another example, the image 102 may be presented in association with the large text 106 using a second display device 112. The image 102 is resized according to the included resizing information to accommodate the large text 106 and forms a second resized image 114, as shown in the second display device 112.

In another example, the image 102 may be presented in association with both the small text 104 and the large text 106 using a third display device 116. The image 102 is resized according to the included resizing information to accommodate the small text 104 and forms the first resized image 110, as shown in the third display device 116. In addition, the image 102 is resized according to the included resizing information to accommodate the large text 106 and forms the second resized image 114, as shown in the third display device 116.

A resized image may include associated drawing information or the associated drawing information may be presented along with the resized image. For example, the drawing information may be visually presented on top of the resized image when displaying the image 102 with drawing information.

FIG. 2A shows an example of the image 102 that includes a resizable region 202. The resizable region 202 is defined by resizing information including a vertical bar 204 and a horizontal bar 206 (examples of indication pixels). The vertical bar 204 defines the height and vertical position of the resizable region 202 within the image 102. The horizontal bar 206 defines the width and horizontal position of the resizable region 202 within the image 102.

In some implementations, the vertical bar 204 and the horizontal bar 206 have a predetermined pixel width and color. For example, the vertical bar 204 and the horizontal bar 206 may be black in color and one pixel in thickness.

In some implementations, the vertical bar of the resizable region 202 is placed on the left side of the image 102. In some implementations, the horizontal bar of the resizable region 202 is placed on the top side of the image 102. Alternatively, resizing information may be placed in locations other than the left and top sides of the image 102.

Figure 2B:
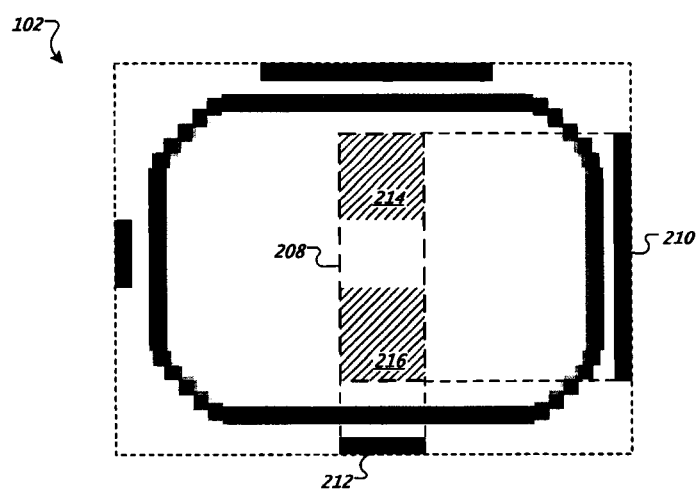
FIG. 2B shows an example of an image that includes a drawing region.

FIG. 2B shows an example of the image 102 that includes a drawing region 208. The drawing region 208 is the area in which the drawing information is presented. In some implementations (e.g., where a drawing region is not specified), the drawing region defaults to the resizable region 202.

The drawing region 208 is defined by a vertical bar 210 and a horizontal bar 212. The vertical bar 210 defines the height and vertical position of the drawing region 208 within the image 102. The horizontal bar 212 defines the width and horizontal position of the drawing region 208 within the image 102. The vertical bar 210 and the horizontal bar 212 may have predetermined pixel width and color, as previously described.

In some implementations, the vertical bar of the drawing region 208 is placed on the right side of the image 102. In some implementations, the horizontal bar of the drawing region 208 is placed on the bottom side of the image 102. Alternatively, drawing region information may be placed in locations other than the right and bottom sides of the image 102.

The drawing region 208 may have a width or height that is different than the resizable region 202. This may allow padding and/or overlap between the regions defined by the resizable region 202 and the drawing region 208. In the example of FIGS. 2A and 2B, the vertical bar 210 defining the drawing region 208 is longer than the vertical bar 204 defining the resizable region 202. This results in allowing the drawing information to overlap the region above the resizable region 202 as indicated by shaded areas 214 and 216.

In addition, in the depicted example, the horizontal bar 212 of the drawing region 208 is shorter than the horizontal bar 206 of the resizable region 202. This results in a padding of space that is unused by the drawing information, as indicated by shaded areas 218 and 220 in FIG. 2A.

Figure 3A:
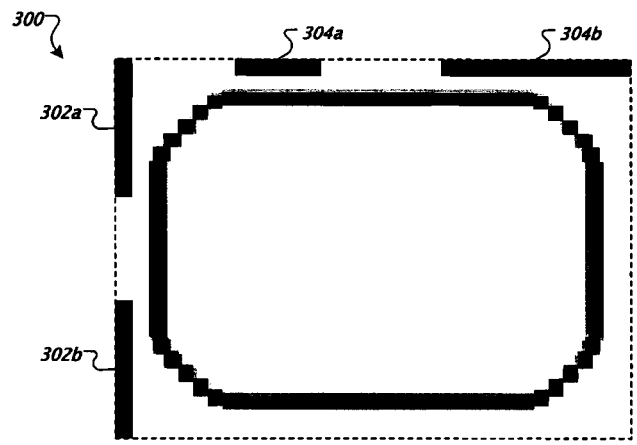
FIGS. 3A-D show an example of an image that includes multiple resizable regions.

FIG. 3A shows an example of an image 300 that includes multiple resizable regions. The vertical size and position of the resizable regions are defined by multiple vertical bars 302a-b. The horizontal size and position of the resizable regions are defined by multiple horizontal bars 304a-b.

Figure 3B:
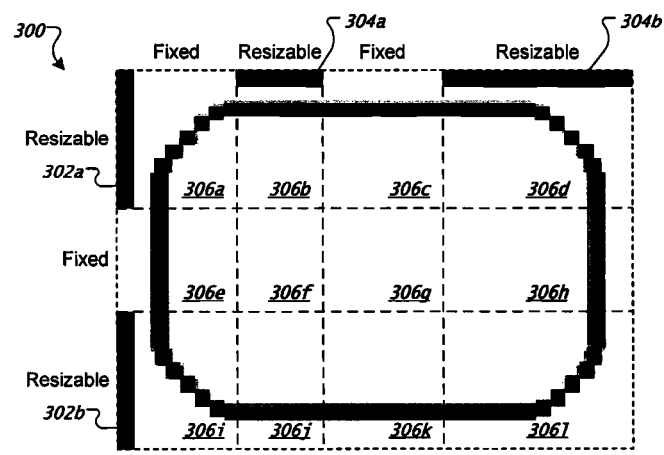

FIG. 3B shows an example of the image 300 that identifies the fixed and resizable aspects of the image 300. In particular, the image 300 includes multiple regions 306a-l whose resizable aspects are defined by the vertical bars 302a-b and the horizontal bars 304a-b.

Each of the regions 306a-l is either fixed in size or resizable in the vertical direction as defined by the vertical bars 302a-b. In particular, the vertical bar 302a indicates that the regions 306a-d in the first row are resizable in the vertical direction. The absence of a bar at the second row indicates that the regions 306e-h have a fixed size in the vertical direction. The vertical bar 302b indicates that the regions 306i-l in the third row are resizable in the vertical direction.

Each of the regions 306a-l is either fixed in size or resizable in the horizontal direction as defined by the horizontal bars 304a-b. In particular, the absence of marking pixels (e.g., which can form a bar) at the first column indicates that the regions 306a, 306e, and 306i have a fixed size in the horizontal direction. The horizontal bar 304a indicates that the regions 306b, 306f, and 306j in the second column are resizable in the horizontal direction. The absence of a bar at the third column indicates that the regions 306c, 306g, and 306k have a fixed size in the horizontal direction. The horizontal bar 304b indicates that the regions 306d, 306h, and 306l in the fourth column are resizable in the horizontal direction.

A region may be resizable in one direction and have a fixed size in the other direction. For example, the region 306a is resizable in the vertical direction and has a fixed size in the horizontal direction. The region 306f has a fixed size in the vertical direction and is resizable in the horizontal direction.

In some implementations, when resizing a region, the region of the image 300 may be rescaled (e.g., stretched) or tiled. For example, where the region 306a is rescaled vertically to twice the original vertical size of the region 306a, then individual pixels, vectors, or other drawing elements may be doubled in size. Rescaling may also include interpolating image information between a first drawing element and a subsequent drawing element. In another example, where the region 306b is tiled horizontally to three times the original horizontal size of the region 306b, then the region 306b may be copied three times with the copies placed side by side to resize the region 306b. A fractional portion of a region may also be used during tiling.

In some implementations, multiple types of resizing may be used within the same region, either in the same direction or separate directions. For example, the region 306b may be tiled in the horizontal direction and rescaled in the vertical direction. Additional information may be included in the image 300 to identify the type of resizing to be used. For example, multiple rows and columns of bars may be used to identify the type of resizing used for each of the regions 306a-l (e.g., first row and column of bars indicate rescaling while second row and column of bars indicate tiling). In another example, a color or pattern of the vertical bars 302a-b and the horizontal bars 304a-b may indicate the type of resizing used (e.g., gray bars indicate rescaling and black bars indicate tiling).

In another example, a color or pattern of either the vertical or horizontal bars can indicate a type of interpolation used when stretching a portion of the image. For example, red pixels within a bar may indicate that the corresponding portion should be stretched using linear interpolation and blue pixels within a bar may indicate that the corresponding portion should use non-linear interpolation.

In yet another example, a color or pattern of the horizontal or vertical bars can indicate whether the corresponding portion should be a drawable region or a stretchable (or static) region. For example, if marking pixels within a bar are gray, the corresponding section will be a drawing section. If the marking pixels are black, the section with be a stretchable section.

In some implementations, the regions 306a-l are resized in proportion to the relative sizes of the vertical bars 302a-b and/or the horizontal bars 304a-b. For example, the horizontal component of the regions 306b, 306f, and 306j may be resized proportionally to the horizontal component of the regions 306d, 306h, and 306l as determined by the size of the horizontal bars 304a-b, respectively. In another example, the vertical components of the regions 306a-d may be resized proportionally to the vertical components of the regions 306i-l as determined by the vertical bars 302a-b, respectively. In another example, all of the resizable components may be resized proportionally irrespective of the direction (e.g., vertical or horizontal).

Figure 3C:
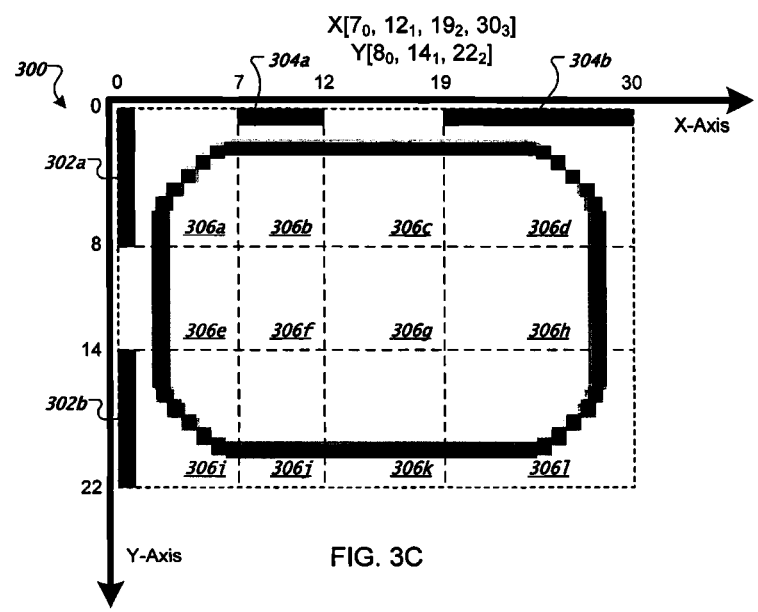

FIG. 3C shows an example of the image 300 that identifies the relative sizes of the regions 306a-l. The image 300 may be parsed to identify the length of the vertical bars 302a-b and the horizontal bars 304a-b.

In some implementations, a list of the horizontal lengths and the vertical lengths is constructed. The lengths of the vertical bars 302a-b and the horizontal bars 304a-b may be measured relative to the top left corner of the image 300. For example, the horizontal list may include the starting and ending pixels for each column (e.g., X[7, 12, 19, 30]) and the vertical list may include the starting and ending pixels for each row (e.g., Y[8, 14, 22]). In this example, the starting pixel for the first column and row is always zero and is omitted from the lists. Also, as can be seen from FIG. 3C, pairs of values within the arrays (e.g., 7, 12 and 19, 30 for the x-axis) define the stretchable regions within the image, however, in other implementations, static portions can be specified.

The lists allow the regions 306a-l of the image 300 to be accessed and resized. The regions 306a-l may be rescaled or tiled, as previously described. The regions 306a-l may also undergo other processing, such as the addition of a color.

Figure 3D:
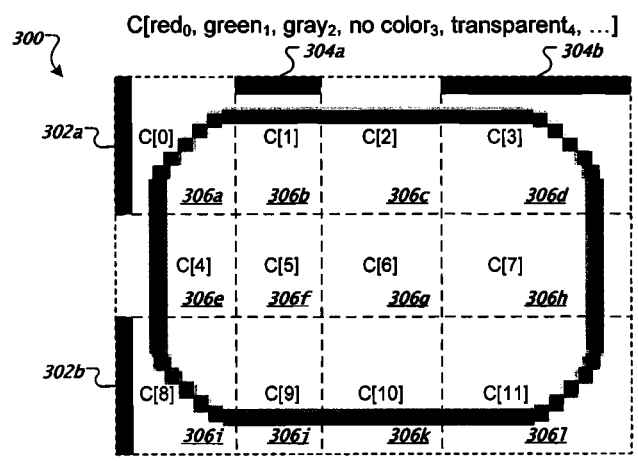

FIG. 3D shows an example of the image 300 that identifies colors associated with the regions 306a-l. The color information may be stored within the image 300 or separate from the image 300. Each of the regions 306a-l may have an associated color. The associated colors may be stored in a list (e.g., C[red, green, gray, no color, transparent . . . ]). For example, the regions 306a-e may have associated colors of red, green, gray, no color, and transparent, respectively. That is, during processing the color red may be added to the region 306a, the color green may be added to the region 306b, the color gray may be added to the region 306c, no color is added to the region 306d, and the region 306e is made transparent.

Figure 4:
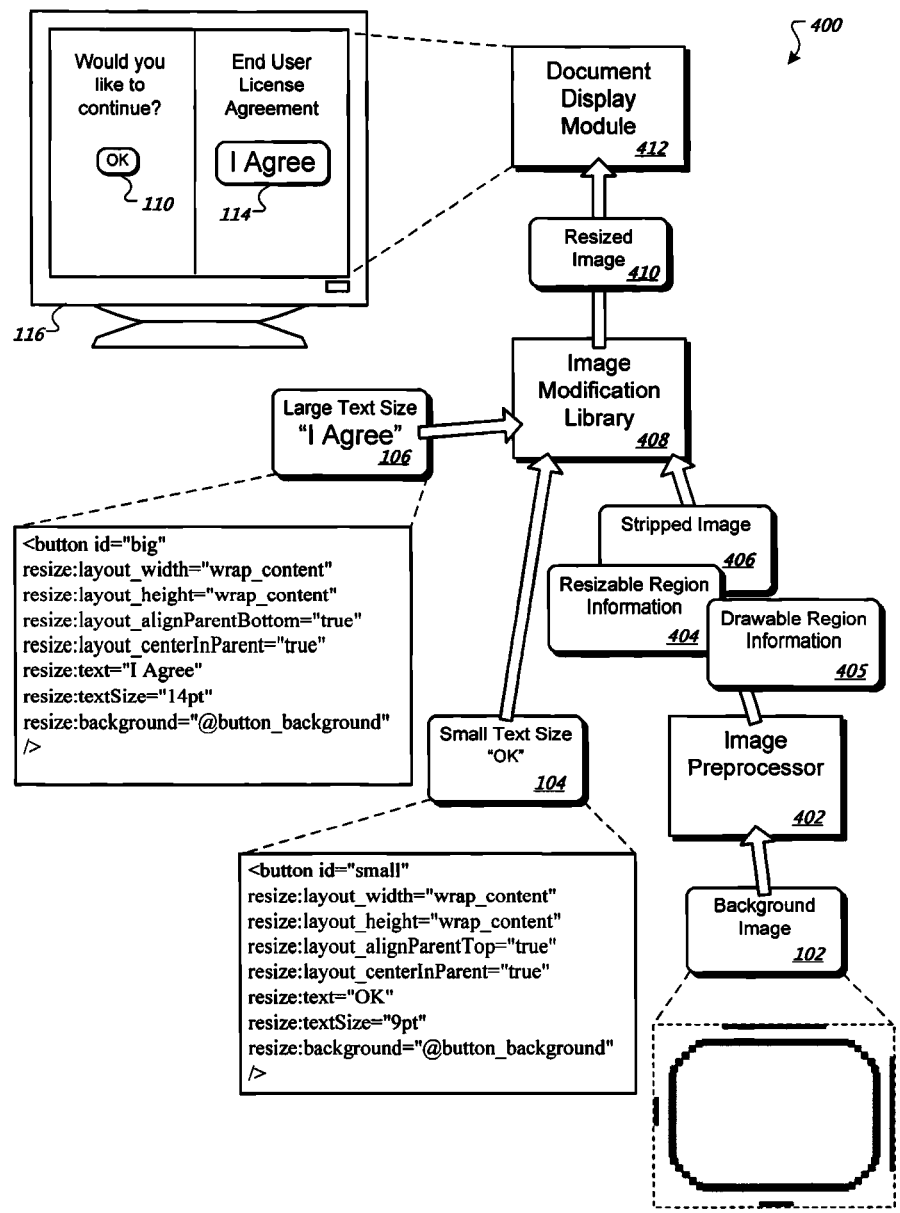
FIG. 4 is a schematic diagram showing an example of a system for resizing an image.

FIG. 4 is a schematic diagram showing an example of a system 400 for resizing the image 102. The system 400 includes the image 102, the small text 104, and the large text 106.

A user may create the small text 104 and the large text 106 using a text editor. The small text 104 contains information that defines the layout and content of the small text 104. The large text 106 contains information that describes the layout and content of the large text 106. For example, the small text 104 and the large text 106 may include a markup language, such as Extensible Markup Language (XML) or Hypertext Markup Language (HTML). The small text 104 indicates that the content is the term "OK," the content has a font size of 8 point (pt), the content is aligned with the top of a parent element, and the content is centered from left to right in the parent element. The large text 106 indicates that the content is the phrase "I Agree," the content has a font size of 14 pt, the content is aligned with the bottom of a parent element, and the content is centered from left to right in the parent element. The small text 104 and the large text 106 both indicate that the image 102 is used as a background image for the texts.

A user may create the image 102, as previously described, using an image editor. The image 102 can include resizing information. The resizing information defines the resizable regions within the image 102. The resizing information and/or the image 102 may also include information describing one or more drawing regions within the image 102.

An image preprocessor 402 receives the image 102. The image preprocessor 402 parses the image 102 to determine the resizable regions and, in some implementations, the drawing regions. The image preprocessor 402 may process images as they are requested for display at a display device or the image preprocessor 402 may process the images and store the processed information for subsequent requests. In some implementations, the image preprocessor 402 identifies images for processing based on an identifier in the file name of the images, such as a file extension, or an identifier in metadata associated with the file. In some implementations, the image preprocessor 402 identifies images for processing by determining if drawing information, such as the small text 104 and the large text 106, includes a reference to one or more images for resizing.

In some implementations, the image preprocessor 402 removes or strips the resizing information, drawable area information, or both from the image 102. Alternatively, the resizing information or the drawable area information may remain within the image 102. For example, the resizing information such as the vertical bar 204 and the horizontal bar 206, or the drawable area information such as the vertical bar 210 and the horizontal bar 212, may be a size, color, or shape that is unnoticed by a user viewing the image 102, unobtrusive, or otherwise integrated within the image 102. The image preprocessor 402 can output the results of parsing the image 102 as resizable region information 404, drawing region information 405, or both. The image preprocessor 402 may also output a stripped image 406.

An image modification library 408 can receive the resizable region information 404, the drawing region information 405, and the stripped image 406. The image modification library 408 can combine drawing information, such as the small text 104 or the large text 106, with the resizable region information 404, the drawing region information, and the stripped image 406 to form a resized image 410. The image modification library 408 may also translate the drawing information into a markup language format used by a document display module 412.

The document display module 412 (e.g., a web browser) can present the drawing information in association with the correspondingly resized image. For example, the document display module 412 presents the small text 104 including the content "OK" in association with the first resized image 110. The document display module 412 also can present the large text 106 including the content "I Agree" in association with the second resized image 114.

Figure 5:
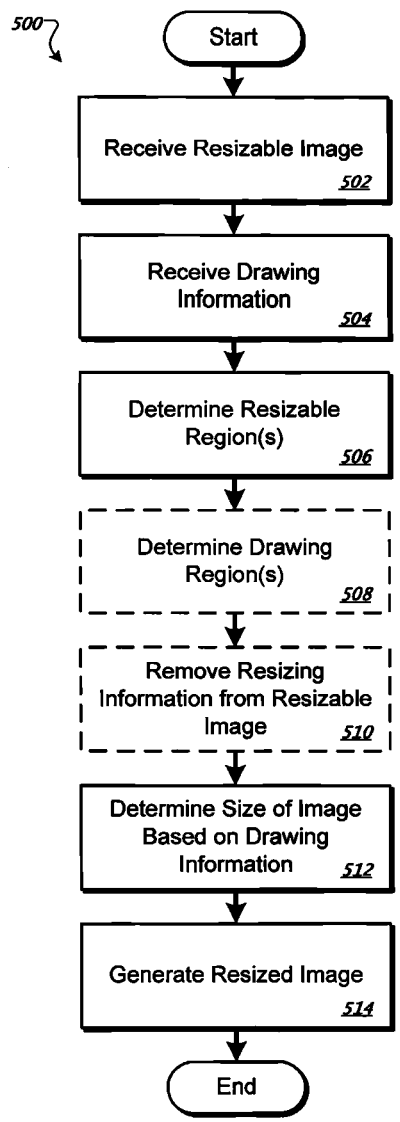
FIG. 5 is a flow chart showing an example of a process for resizing an image.

FIG. 5 is a flow chart showing an example of a process 500 for resizing an image. The process 500 may be performed, for example, by a system such as the systems 100 and 400. For clarity of presentation, the description that follows uses the systems 100 and 400 as the basis of an example for describing the process 500. However, another system, or combination of systems, may be used to perform the process 500.

The process 500 receives (502) a resizable image. For example, the image preprocessor 402 receives the image 102.

The process 500 receives (504) drawing information. For example, the image modification library 408 receives the small text 104 and the large text 106.

The process 500 determines (506) one or more resizable regions of the resizable image based on resizing information within the resizable image. For example, the image preprocessor 402 parses the image 102. The image preprocessor 402 identifies the vertical bar 204 and the horizontal bar 206 that define the resizable regions. The image preprocessor 402 may store the resizing information in a structure or list and pass the information to the image modification library 408.

Optionally, the process 500 determines (508) one or more drawing regions of the resizable image based on the resizing information within the resizable image. For example, the image preprocessor 402 parses the image 102. The image preprocessor 402 identifies the vertical bar 210 and the horizontal bar 212 that define the drawing regions. The image preprocessor 402 may store the drawing region information in a structure or list and pass the information to the image modification library 408.

Optionally, the process 500 removes (510) the resizing information from the resizable image. For example, the image preprocessor 402 may remove the vertical bar 204, the horizontal bar 206, the vertical bar 210, and the horizontal bar 212 from the image 102 and output the stripped image 406 to the image modification library 408.

The process 500 determines (512) a size of the resizable image based on the drawing information. For example, the image modification library 408 uses the drawing information, such as the small text 104 or the large text 106, to determine an amount to resize the resizable regions within the image 102 and/or the stripped image 406.

The process 500 generates (514) a resized image based on the determined size and the resizable image. For example, the image modification library 408 generates the first resized image 110 based on the small text 104 and the second resized image 114 based on the large text 106.

Figure 6:
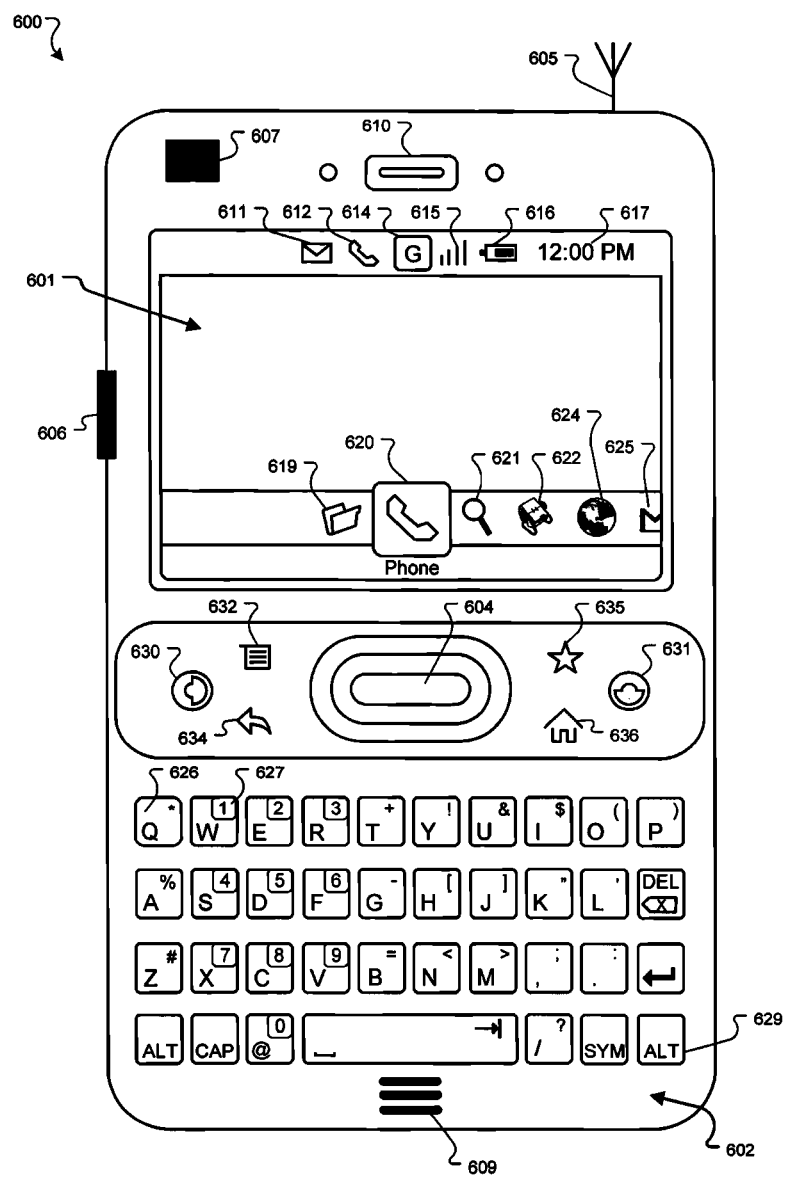
FIG. 6 is a schematic representation of an exemplary mobile device that implements embodiments of the image resizing described herein.

Referring now to FIG. 6, the exterior appearance of an exemplary device 600 that implements the image resizing is illustrated. Briefly, and among other things, the device 600 includes a processor configured to perform one or more of the following operations: parse resizing information within an image, parse information from the image related to drawing regions on the image, remove visible indications for the resizing and/or drawing information from the image, resize the image based on the resizing information, and draw content on the image in an area indicated by the drawing information.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610. Although the device 600 includes an external antenna, it is anticipated that the device 600 can include an internal antenna, which is not visible to the user.

The display 601 displays video, graphics, images, and text that make up the user interface for the software applications used by the device 600, and the operating system programs used to operate the device 600. Among the possible elements that may be displayed on the display 601 are a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, a mapping application icon 624, an email application icon 625, or other application icons. In certain implementations, the icons can include the resizable image as a background and either text or another image as content drawn on the background as described previously. For example, when the user selects an icon, the processor can enlarge the background image and the corresponding content by increasing the size of the stretchable regions and the corresponding content.

In one example implementation, the display 601 is a quarter video graphics array (QVGA) thin film transistor (TFT) liquid crystal display (LCD), capable of 16-bit or better color.

A user uses the keyboard (or "keypad") 602 to enter commands and data to operate and control the operating system and applications on the device 600. The keyboard 602 includes standard keyboard buttons or keys associated with alphanumeric characters, such as keys 626 and 627 that are associated with the alphanumeric characters "0" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish call key 630 that causes a received call to be answered or a new call to be originated; a terminate call key 631 that causes the termination of an active call; a drop down menu key 632 that causes a menu to appear within the display 601; a backwards navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access 2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM10200A chipset with an QUALCOMM® RTR9285™ transceiver and PM10840™ power management circuit.

The wireless or wireline computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wireline or wireless connector. Example wireless connectors include, for example, an INFRARED DATA ASSOCIATION® (IrDA®) wireless connector, a Wi-Fi wireless connector, an optical wireless connector, an INSTITUTE OF ELECTRICAL AND ELECTRONICS ENGINEERS® (IEEE®) Standard 802.11 wireless connector, a BLUETOOTH® wireless connector (such as a BLUETOOTH® version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, a IEEE®-1694 FIREWIRE® connector, a Universal Serial Bus (USB) connector (including a mini-B USB interface connector), a serial port connector, a parallel port connector, or other wireline connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 3 mega-pixel (MP) camera that utilizes a complementary metal-oxide semiconductor (CMOS). The camera may also be associated with software to perform various functions on captured images, such as identification of certain portions of an image to permit for cropping of those portions from the image.

The microphone 609 allows the device 600 to capture sound, and may be an omni-directional microphone, a unidirectional microphone, a bi-directional microphone, a shotgun microphone, or other type apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
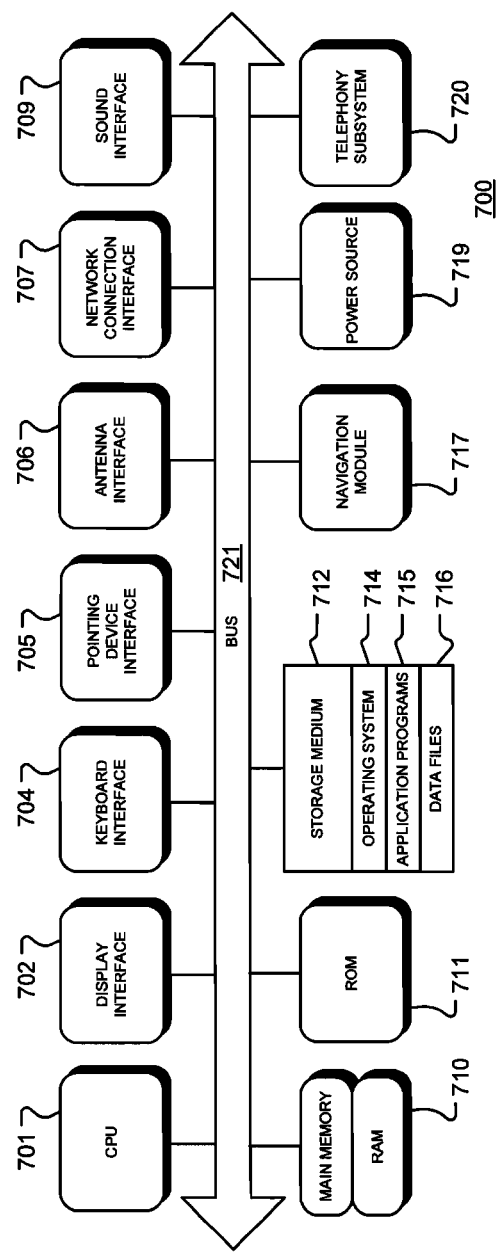
FIG. 7 is a block diagram illustrating the internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 709 that provides a communication interface and processing functions for capturing digital images from the camera 607; a sound interface that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 713, application programs 715 (including, for example, a web browser application, a widget or gadget engine, and or other applications, as necessary) and data files 719 are stored; a navigation module 717 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 is one of a number of computer processors, including. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to receive an image having indication pixels that define a plurality of regions within the image that are used for resizing the image, determine, based on the indication pixels, two or more of the regions that are stretchable regions that change size when the image is resized, and resize the image by changing a size of at least one of the determined stretchable regions based on a size of content to be drawn on the image.

The operating system 713 may be a LINUX®-based operating system such as the GOOGLE® mobile device platform; APPLE® MAC OS X®; MICROSOFT® WINDOWS NT®/WINDOWS® 2000/WINDOWS® XP/WINDOWS MOBILE; a variety of UNIX®-flavored operating systems; or a proprietary operating system for computers or embedded systems. The application development platform or framework for the operating system 713 may be: BINARY RUNTIME ENVIRONMENT FOR WIRELESS® (BREW®); JAVA® Platform, Micro Edition (JAVA® ME) or JAVA® 2 Platform, Micro Edition (J2ME®) using the SUN MICROSYSTEMS® JAVASCRIPT® programming language; PYTHON™, FLASH LITE®, or MICROSOFT®.NET Compact, or another appropriate environment.

The device stores computer-executable code for the operating system 713, and the application programs 715 such as an email, instant messaging, a video service application, a mapping application word processing, spreadsheet, presentation, gaming, mapping, web browsing, JAVASCRIPT® engine, or other applications. For example, one implementation may allow a user to access the GOOGLE® GMAIL® email application, the GOOGLE® TALK® instant messaging application, a YOUTUBE® video service application, a GOOGLE® MAPS® or GOOGLE® EARTH® mapping application, or a GOOGLE® PICASA® imaging editing and presentation application. The application programs 715 may also include a widget or gadget engine, such as a TAFRI™ widget engine, a MICROSOFT® gadget engine such as the WINDOWS SIDEBAR® gadget engine or the KAPSULES™ gadget engine, a YAHOO!® widget engine such as the KONFABULTOR™ widget engine, the APPLE® DASHBOARD® widget engine, the GOOGLE® gadget engine, the KLIPFOLIO® widget engine, an OPERA™ widget engine, the WIDSETS™ widget engine, a proprietary widget or gadget engine, or other widget or gadget engine the provides host system software for a physically-inspired applet on a desktop.

Although it is possible to provide for image resizing using the above-described implementation, it is also possible to implement the functions according to the present disclosure as a dynamic link library (DLL), or as a plug-in to other application programs such as an Internet web-browser such as the FOXFIRE web browser, the APPLE® SAFARI® web browser or the MICROSOFT® INTERNET EXPLORER® web browser.

The navigation module 721 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 721 may also be used to measure angular displacement, orientation, or velocity of the device 600, such as by using one or more accelerometers.

Figure 8:
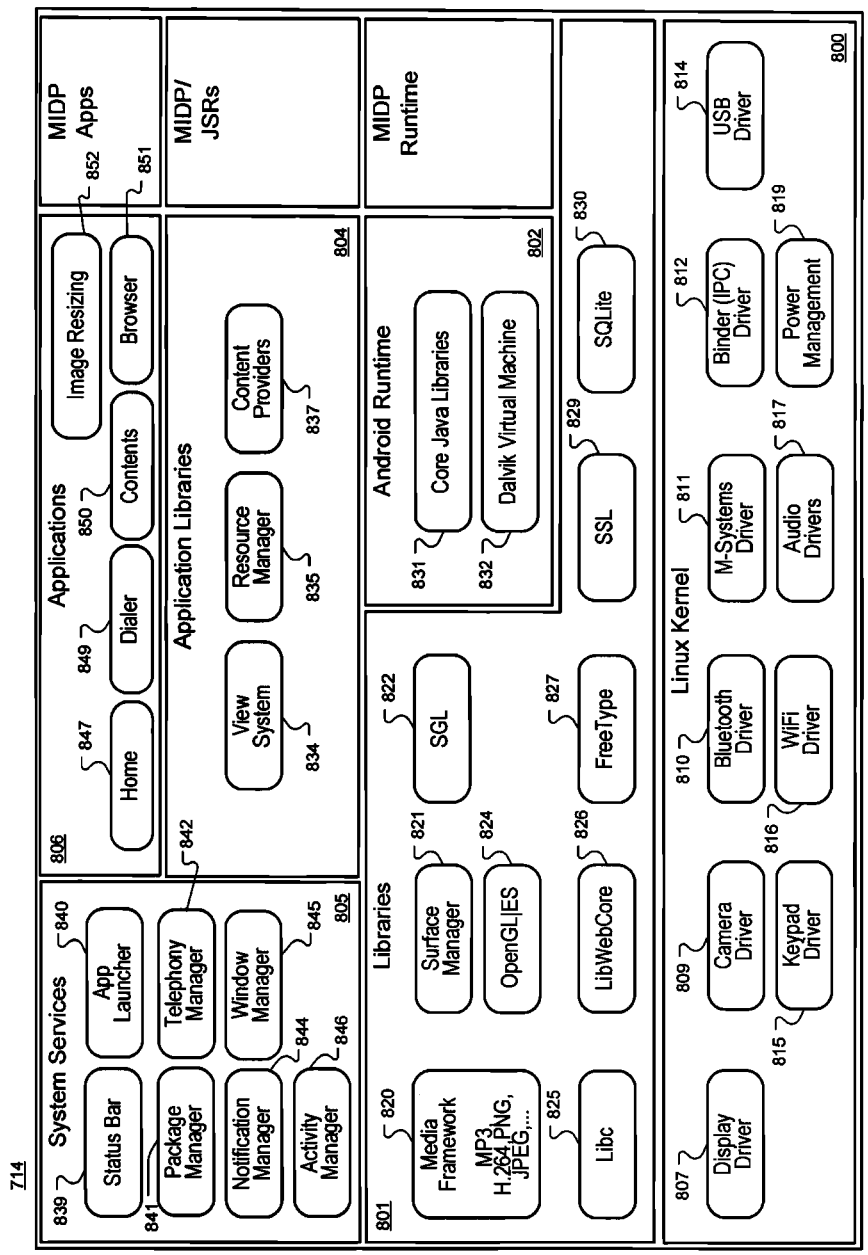
FIG. 8 is a block diagram illustrating exemplary components of the operating system used by the device of FIG. 6.

FIG. 8 is a block diagram illustrating exemplary components of the operating system 813 used by the device 800, in the case where the operating system 813 is the GOOGLE® ANDROID® operating system. The operating system 813 invokes multiple processes, while ensuring that the associated phone application is responsive, and that wayward applications do not cause a fault (or "crash") of the operating system. Using task switching, the operating system 813 allows for the switching of applications while on a telephone call, without losing the state of each associated application. The operating system 813 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 813 can generally be organized into six components: a kernel 800, libraries 801, an operating system runtime 802, application libraries 804, system services 805, and applications 806. The kernel 800 includes a display driver 807 that allows software such as the operating system 813 and the application programs 815 to interact with the display 601 via the display interface 802, a camera driver 809 that allows the software to interact with the camera 607; a BLUETOOTH® driver 810; a M-Systems driver 811; a binder (IPC) driver 812, a USB driver 814 a keypad driver 815 that allows the software to interact with the keyboard 602 via the keyboard interface 804; a WiFi driver 816; audio drivers 817 that allow the software to interact with the microphone 609 and the speaker 610 via the sound interface 809; and a power management component 819 that allows the software to interact with and manage the power source 819.

The BLUETOOTH® driver, which in one implementation is based on the BlueZ BLUETOOTH® stack for LINUX®-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH® driver provides JAVA® bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer 3 (MP3), Advanced Audio Coding (AAC), Adaptive Multi-Rate (AMR), Joint Photographic Experts Group (JPEG), and others) using an efficient JAVA® Application Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802, which in some implementations makes up a Mobile Information Device Profile (MIDP) runtime, includes core JAVA libraries 831, and a Dalvik virtual machine 832. The Dalvik virtual machine 832 is a custom, JAVA-compatible virtual machine that runs a customized file format (.DEX) as well as unmodified JAVA files (.CLASS/.JAR). With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized byte code interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file format at build-time. The associated byte codes are designed for quick interpretation, since register-based instead of stack-based instructions reduce memory and dispatch overhead, since using fixed width instructions simplifies parsing, and since the 16-bit code units minimize reads.

The application libraries 804, which generally make up the MIDP JAVA® Specification Requests (JSRs), includes a view system 834, a resource manager 835, and content providers 837. The system services 805 includes a status bar 839; an application launcher 840; a package manager 841 that maintains information for all installed applications; a telephony manager 842 that provides an application level JAVA® interface to the telephony subsystem 820; a notification manager 844 that allows all applications access to the status bar and on-screen notifications; a window manager 845 that allows multiple applications with multiple windows to share the display 601; and an activity manager 846 that runs each application in a separate process, manages an application life cycle, and maintains a cross-application history.

The applications 806, which generally make up the MIDP applications, include a home application 847, a dialer application 849, a contacts application 850, a browser application 851, and an image resizing application 852.

The telephony manager 842 provides event notifications (such as phone state, network state, Subscriber Identity Module (SIM) status, or voicemail status), allows access to state information (such as network information, SIM information, or voicemail presence), initiates calls, and queries and controls the call state. The browser application 851 renders web pages in a full, desktop-like manager, including navigation functions. Furthermore, the browser application 851 allows single column, small screen rendering, and provides for the embedding of HTML views into other applications.

Figure 9:
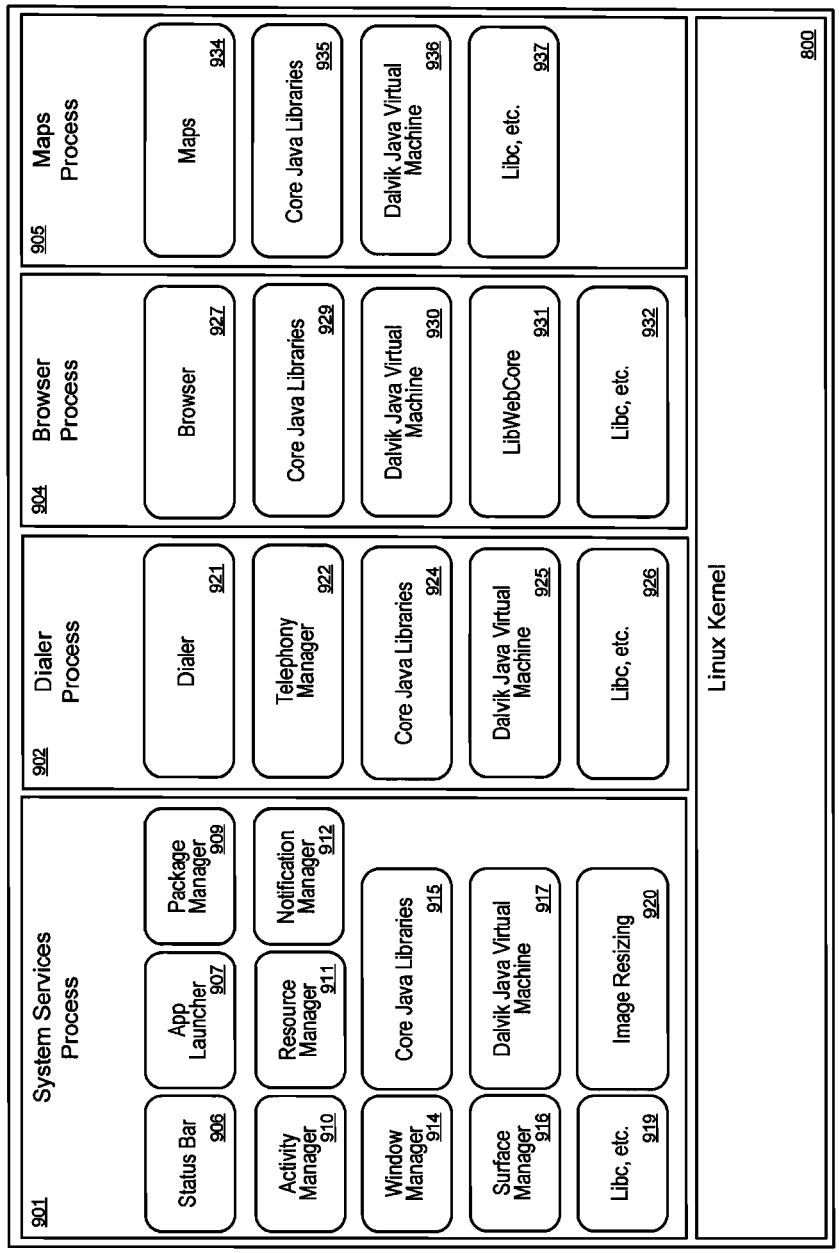
FIG. 9 is a block diagram illustrating exemplary processes implemented by the operating system kernel of FIG. 8.

FIG. 9 is a block diagram illustrating exemplary processes implemented by an operating system kernel 940. Generally, applications and system services run in separate processes, where the activity manager 846 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

The persistent core system services, such as the surface manager 916, the window manager 914, or the activity manager 910, are hosted by system processes, although application processes, such processes associated with the dialer application 921, may also be persistent. The processes implemented by the operating system kernel 940 may generally be categorized as system services processes 901, dialer processes 902, browser processes 904, and maps processes 905. The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with a resource manager that provides access to graphics, localized strings, and XML layout descriptions; notification manger processes 912 associated with the notification manager 844; window manager processes 914 associated with the window manager 845; core JAVA® libraries processes 915 associated with the core JAVA® libraries 831; surface manager processes 916 associated with the surface manager 821; Dalvik JAVA® virtual machine processes 917 associated with the Dalvik virtual machine 832, LIBC processes 919 associated with the LIBC library 825; and image resizing processes 920 associated with the image resizing application 852.

The dialer processes 902 include dialer application processes 921 associated with the dialer application 849; telephony manager processes 922 associated with the telephony manager 842; core JAVA® libraries processes 924 associated with the core JAVA® libraries 831; Dalvik JAVA® virtual machine processes 925 associated with the Dalvik Virtual machine 832; and LIBC processes 926 associated with the LIBC library 825. The browser processes 904 include browser application processes 927 associated with the browser application 851; core JAVA® libraries processes 929 associated with the core JAVA® libraries 831; Dalvik JAVA® virtual machine processes 930 associated with the Dalvik virtual machine 832; LIBWEBCORE processes 931 associated with the LIBWEBCORE library 826; and LIBC processes 932 associated with the LIBC library 825.

The maps processes 905 include maps application processes 934, core JAVA® libraries processes 935, Dalvik JAVA® virtual machine processes 936, and LIBC processes 937. Notably, some processes, such as the Dalvik JAVA® virtual machine processes, may exist within one or more of the systems services processes 901, the dialer processes 902, the browser processes 904, and the maps processes 905.

Figure 10:
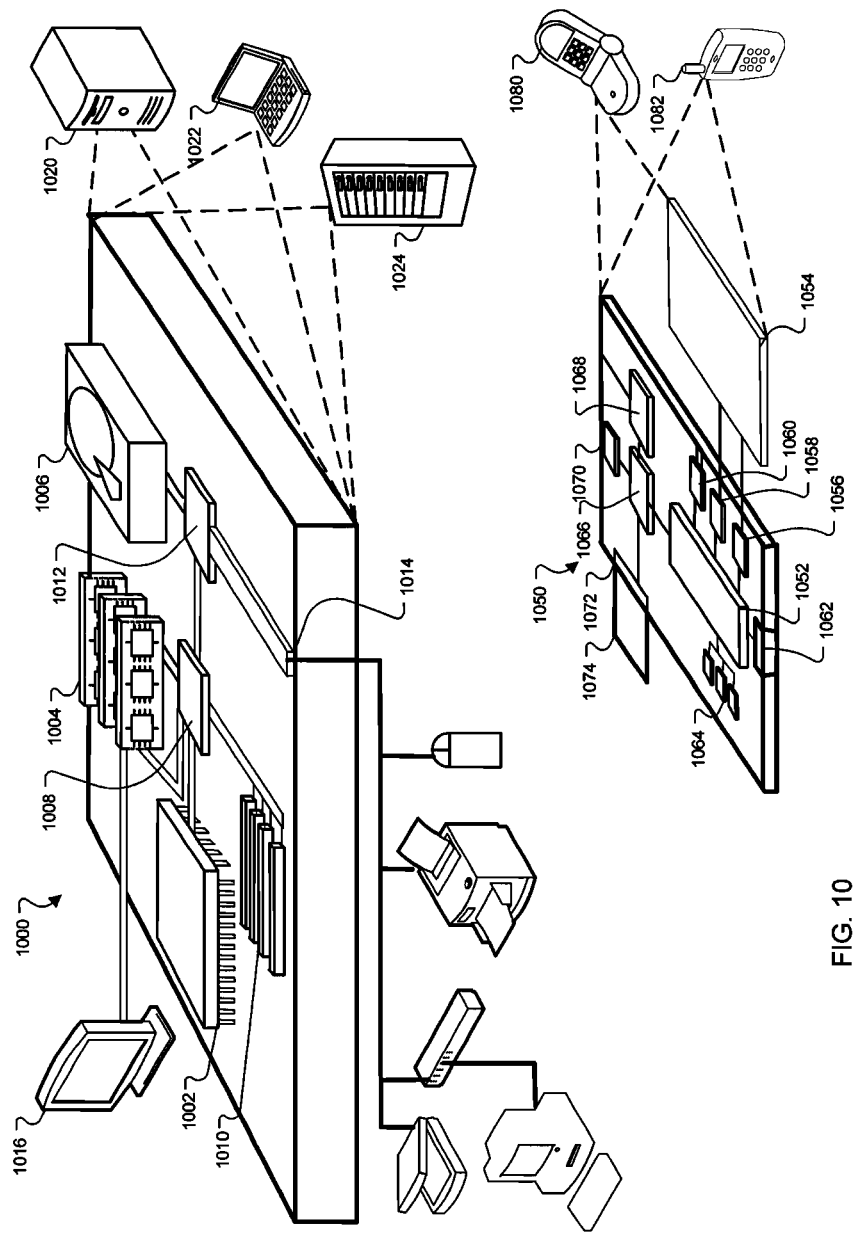
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, elements in the system 400 and the process 500 may be performed in a client and/or server setting. Also, resizing information may be included in an image at a location other than the border of the image, such as a grid or an individual box. In some implementations, the drawing information, such as the content of the small text 104 or the large text 106, may be added to the image 102 during the resizing of the image 102. For example, the small text 104 may be included within the first resized image 110 and the large text 106 may be included within the second resized image 114.

In other implementations, text or other images are part of the image to be resized. A designer can designate the static region so that these portions of the image are not stretched when the image is resized. For example, the design can specify that a portion of the image including text should remain unstretched (e.g., be designated as a static region). When the image is stretched, the static region having the text will not stretch. In this way, a designer may avoid distorting the text (or other images) embedded in the image during resizing.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, by a computing system, an image having indication pixels in the image that are of a particular characteristic and that define two or more regions within the image that are used for resizing the image;
parsing, by the computing system, the image to determine, based on locations of the indication pixels in the image that are identified by the computing system, the two or more of the regions as being stretchable regions that change size when the image is resized;
enlarging, by the computing system, the image by changing a size of at least one of the stretchable regions and leaving fixed in size at least one other region within the image that has not been determined to be stretchable based on the locations of the indication pixels; and
outputting the enlarged image to a graphical user interface for display.

2. The method of claim 1, wherein the image comprises a border that includes the indication pixels.

3. The method of claim 1, wherein the indication pixels are located along x and y-axes of the image.

4. The method of claim 3, wherein determining the two or more regions that are stretchable regions comprises identifying areas that intersect x and y coordinate ranges specified by the indication pixels located along the x and y-axes.

5. The method of claim 3, wherein the indication pixels form colored lines along the x and y-axes.

6. The method of claim 1, wherein determining the two or more regions that are stretchable regions comprises pre-processing the image to determine the two or more regions that are stretchable regions and removing the indication pixels before the image is output to the graphical user interface for display.

7. The method of claim 6, further comprising saving information about the two or more regions that are determined to be stretchable regions in a data structure accessible during execution of the graphical user interface that resizes the image based on the information.

8. The method of claim 1, further comprising determining a drawable region of the image that is configured to display content to be drawn on the image.

9. The method of claim 8, wherein resizing the image comprises changing the size of the stretchable regions so that content fits inside the drawable region.

10. The method of claim 1, wherein resizing the image comprises changing sizes of all the determined stretchable regions.

11. The method of claim 1, wherein the image further comprises drawable area pixels that define one or more drawable areas configured to accept content to be drawn on the image.

12. The method of claim 11, wherein the drawable area pixels are located along first x and y-axes of the image.

13. The method of claim 12, wherein the drawable area pixels are located parallel to the indication pixels located on second x and y-axes.

14. The method of claim 12, further comprising determining the one or more drawable areas by identifying areas that intersect x and y coordinate ranges specified by the drawable area pixels located along the x and y-axes.

15. The method of claim 1, wherein a color of the indication pixels specifies an algorithm for use in resizing the stretchable regions.

16. The method of claim 15, wherein the algorithm is selected from a group consisting of tiling, interpolating, or increasing the size of pixels within the stretchable regions.

17. The method of claim 1, wherein resizing the image is based on a size of content to be drawn on the image.

18. The method of claim 1, wherein enlarging the image further comprises maintaining all of the stretchable regions in substantially the same size relative to each other.

19. The method of claim 1, further comprising removing, by the computing system, the indication pixels from the image or the enlarged image.

20. The method of claim 1, wherein the image is an image file that has been transmitted to the computing system from a remote computing device.

21. A system comprising:
an image pre-processor for receiving an image having indication pixels in the image that are of a particular characteristic and that define two or more stretchable regions within the image that are used for resizing the image;
means for parsing the image to determine, based on the locations of the indication pixels in the image, the stretchable regions that change size when the image is resized; and
a document display module for enlarging the image by changing a size of at least one of the stretchable regions, leaving fixed in size at least one other region within the image that is not defined by the indication pixels as being stretchable, and providing the enlarged image to a graphical user interface for display.

22. The system of claim 21, wherein the indication pixels are located in a border of the image.

23. The system of claim 21, wherein the document display module is further for enlarging the image so that the two or more regions that are stretchable regions maintain substantially the same size relative to each other.

24. The system of claim 21, wherein the document display module is further for removing the indication pixels from the image or the enlarged image.

25. A computer-implemented method comprising:
receiving, by a computing system, an image that includes information integrated within the image that defines a size and location of at least one region within the image that is resizable;
parsing, by the computing system, the image to determine based on the information integrated within the image, the at least one region as being a stretchable region that changes in size when the image is resized;
resizing, by the computing system, the image by changing a size of the at least one region and leaving fixed in size at least one other region within the image that is not defined by the information as being resizable; and
displaying, by the computing system, the resized image.

26. The method of claim 25, wherein the image further comprises drawable area pixels that define one or more drawable areas configured to accept content to be drawn on the image.

27. The method of claim 25, further comprising determining a drawable region of the image that is configured to display content to be drawn on the image.

28. The method of claim 27, wherein resizing the image comprises changing the size of the stretchable regions so that content fits inside the drawable region.

29. The method of claim 25, wherein the information integrated within the image comprises indication pixels in the image that are of a particular characteristic.

30. The method of claim 25, wherein the image is an image file that has been transmitted to the computing system from a remote computing device.

31. A system comprising:
an image pre-processor for receiving an image having information integrated within the image that defines a size and location of at least one region within the image that is resizable;
means for parsing the image to determine, based on the information integrated within the image, the at least one resizable region as being a stretchable region that changes in size when the image is resized; and
a document display module for (i) resizing the image by changing a size of the at least one resizable region and leaving fixed in size at least one other region within the image that is not defined by the information as being resizable, and (ii) displaying the resized image.

32. The system of claim 31, wherein the image further comprises drawable area pixels that define one or more drawable areas configured to accept content to be drawn on the image.

33. The system of claim 31, wherein the information integrated within the image comprises pixels that are located in a border of the image.

34. The system of claim 31, wherein the document display module is further for determining a drawable region of the image that is configured to display content to be drawn on the image.

35. The system of claim 34, wherein resizing the image comprises changing the size of the at least one stretchable region so that content fits inside the drawable region.

36. The system of claim 31, wherein the information integrated within the image comprises indication pixels in the image that are of a particular characteristic.

* * * * *